United States Patent [19]

Becker

[11] 3,912,833

[45] Oct. 14, 1975

[54] FILM PROCESSING APPARATUS AND METHOD FOR INFORMATION STORAGE SYSTEM

[75] Inventor: Charles J. Becker, San Jose, Calif.

[73] Assignee: American Videonetics Corporation, Sunnyvale, Calif.

[22] Filed: June 27, 1973

[21] Appl. No.: 373,986

[52] U.S. Cl. ................ 427/294; 118/203; 118/266; 354/317; 355/78

[51] Int. Cl.²... B05D 1/26; B05D 1/28; G03D 5/00; G03B 27/02

[58] Field of Search ...... 118/203, 265, 266; 355/16, 355/100, 106, 78, 132; 354/297, 301, 303, 317, 323, 95, 13, 14, 89 R, 89 L, 99 R; 117/112, 119

[56] References Cited

UNITED STATES PATENTS

| | | | |
|---|---|---|---|
| 2,665,619 | 1/1954 | Tuttle et al. | 95/89 R X |
| 2,915,393 | 12/1959 | Fairbank | 95/89 R X |
| 3,081,687 | 3/1963 | Takats | 354/317 |
| 3,097,584 | 7/1963 | Wright | 95/89 R X |
| 3,181,444 | 5/1965 | Takats et al. | 354/299 X |
| 3,299,793 | 1/1967 | Lowry | 95/94 R |
| 3,461,787 | 8/1969 | Pfaff | 95/94 R |
| 3,588,030 | 6/1971 | Hile et al. | 95/89 L X |
| 3,700,323 | 10/1972 | Guyette et al. | 355/16 X |
| 3,744,394 | 7/1973 | Firth | 354/317 X |

*Primary Examiner*—Fred L. Braun
*Attorney, Agent, or Firm*—Flehr, Hohbach, Test, Albritton & Herbert

[57] ABSTRACT

Document images recorded upon microfilm using a first film transport are moved to a position to have an image thereof recorded upon a film carried by a second film transport thereby permitting the recording to be applied to the second film in accordance with the positioning of that film rather than in sequence. A system and apparatus serve to process each frame of the film carried by the second film transport for receiving an image of the microfilm image and then serve to effect the transfer.

6 Claims, 12 Drawing Figures

FILM PROCESSING APPARATUS AND METHOD FOR INFORMATION STORAGE SYSTEM

BACKGROUND OF THE INVENTION

This invention pertains to a film processing system, apparatus and method as used in an information storage system of the microfilm type wherein documents may be recorded in succession on microfilm but as they are recorded, they can be transferred to selected locations on another film transported at high speed thereby permitting each document to be recorded into the second film at an appropriate selected location.

In general, there is disclosed herein apparatus for carrying out a method of recording images at randomly selected locations of an image carrier such as a film or length of tape comprising the steps of recording images in succession on a first image carrier as transferrable recordings thereon. Then, selected segments of a second image carrier are moved into closely proximate relation with respect to the recorded images on the first carrier. Then, the images from the first carrier are operatively transferred to the second.

Preferably, the foregoing method is carried out by preparing the first image carrier with stabilization film material thereon to record a miniature image of a document using visible light at ambient temperature and pressure at a portion of the carrier, supporting the second carrier to be quickly moved to dispose a selected segment thereof into closely proximate confronting relation with respect to the image recorded on the first carrier, moving the second carrier to so dispose a segment thereof relative to the first carrier, and then diffusion transferring the unexposed, undeveloped, silver halides from the exposed portion of the first carrier to the second carrier and reducing the halides to blackened metallic silver on an emulsion of the second carrier, the receiving film material disposed on the second carrier being relatively insensitive to visible light, both before and after transfer of the image from the first carrier to the second carrier and, hence, the receiving film and its images remain undamaged by repeated scanning as experienced in a film storage.

SUMMARY OF THE INVENTION AND OBJECTS

In general, there has been provided herein a method and apparatus for carrying out the method of activating a receiving film pursuant to the steps of compressing a spongelike, absorbent, resilient pad against the receiving film, then filling the pad sufficiently with activator fluid to imbibe a segment of the receiving film while maintaining the pad compressed against the receiving film. The next step is to draw off the activator and dry out the pad via a vacuum applied to the pad while the pad remains compressed. The final step is to retract the activator-free pad from the receiving film to sponge off any remaining excess drop of activator carried by the receiving film.

After the receiving film has been treated by the above procedure, means are provided herein for progressively compressing the activated segment of the receiving film against the photoresponsive surface of a stabilization film carrying a latent image thereon so as to provide an image of the latent image onto the receiving film.

In general, it is an object of the present invention to provide an improved film processing system and apparatus for an information storage system particularly useful in recording documents on a film.

Another object of the invention is to provide an improved image transfer station for an information storage system of the above type.

Other objects according to the invention will be more clearly evident from the following detailed description of a preferred embodiment when considered in conjunction with the drawings, in which.

DETAILED DESCRIPTION OF PREFERRED EMBODIMENTS

Figure 1:
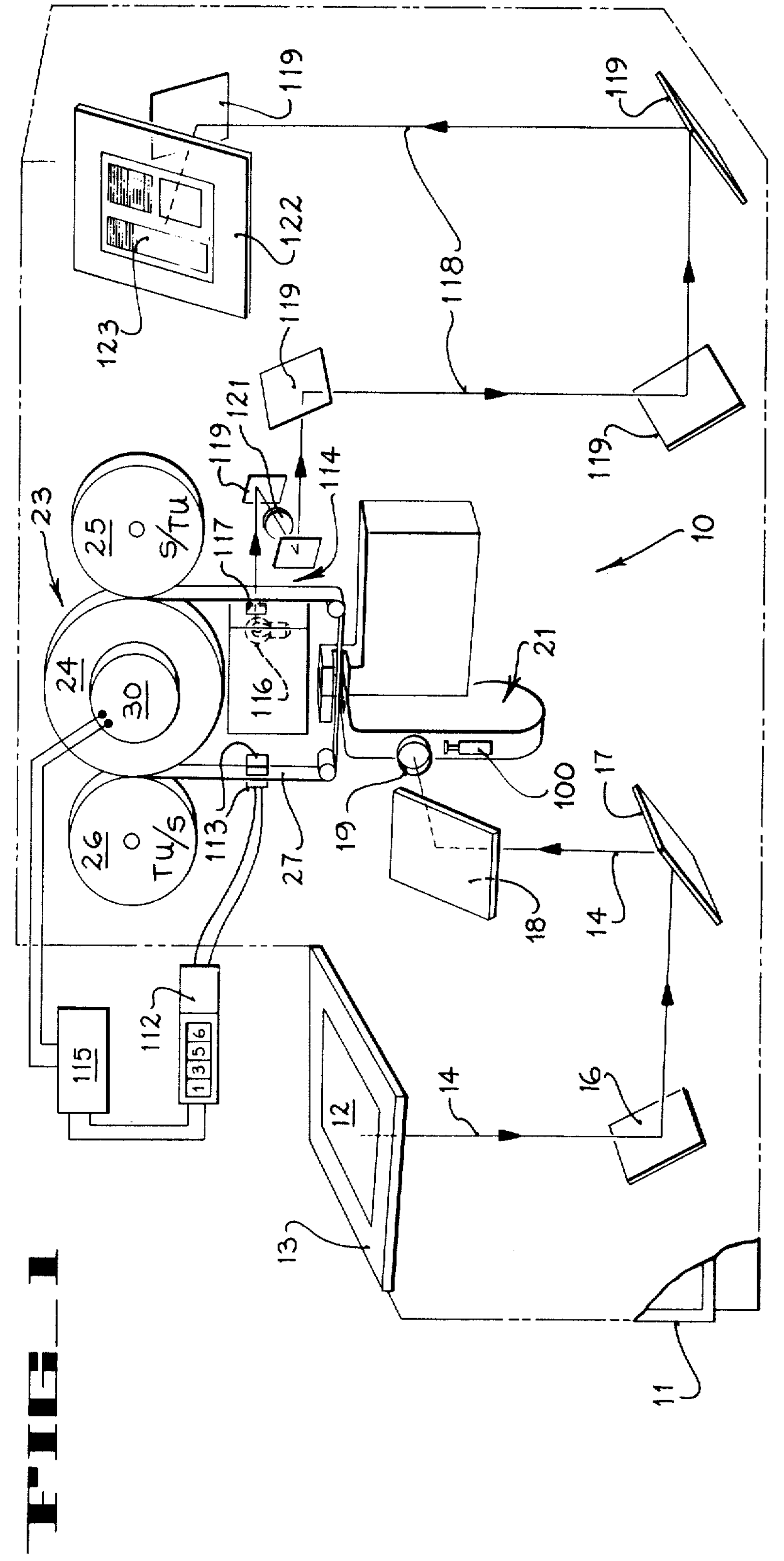
FIG. 1 shows a schematic perspective diagrammatic view of the overall general parts to a system employing the invention.

As generally shown in FIG. 1, a document storage system 10 is shown housed in a cabinet 11 wherein a document 12 or other object can be photographed using ordinary light at ambient pressure and temperature so that an image of document 12 is projected downwardly through window 13 along path 14 to a front surface mirror 16 and then further along path 14 to another front surface mirror 17 to yet another front surface mirror 18 where the lens 19 can take a picture of document 12.

A microfilm transport 21 records a latent image of document 12 upon an image carrier such as a stabilization film 22. The latent image can later be developed as will be further described below.

Stabilization film 22 is of known type such as those photoresponsive pliant films of a type carrying thereon developing agent. Thus, when an exposed frame of this type of film is subjected to an appropriate activator, the image recorded on the film is developed. One suitable type of stabilization film contains a suitable reducing agent of the hydroquinone type.

A high speed tape transport apparatus 23 of a type such as shown in U.S. Pat. Nos. 3,370,803 or 3,370,804, or of other known type, including a rotating capstan 24 driven by a motor 30 serves to rotate the supply and take-up rolls 25, 26, respectively, of a length of receiving film 27 forming a second image carrier upon which "positives" of the "negatives" from film 22 are to be stored.

Receiving film 27 is of suitable known type and style provided with a coating of material which is normally inactive but capable of being activated to receive an image transferred thereto of the image recorded on film 22 and is also generally insensitive to ordinary light. One known and suitable type of receiving film includes a pliant base of acetate or "Mylar"* film which is preferably transparent, with an emulsion for receiving the unexposed, undeveloped, silver halides from the exposed stabilization film so that the receiving film is reduced to blackened metallic silver on the emulsion. Such a film material, for example, can be prepared from a formulation comprising substantially 30 parts sodium thiosulfate, 68 parts sodium bicarbonate, 275 parts potassium bromide, 1 part silver and 600 parts water applied to the acetate or Mylar by appropriate means.

Figures 8, 9, 10, 11:
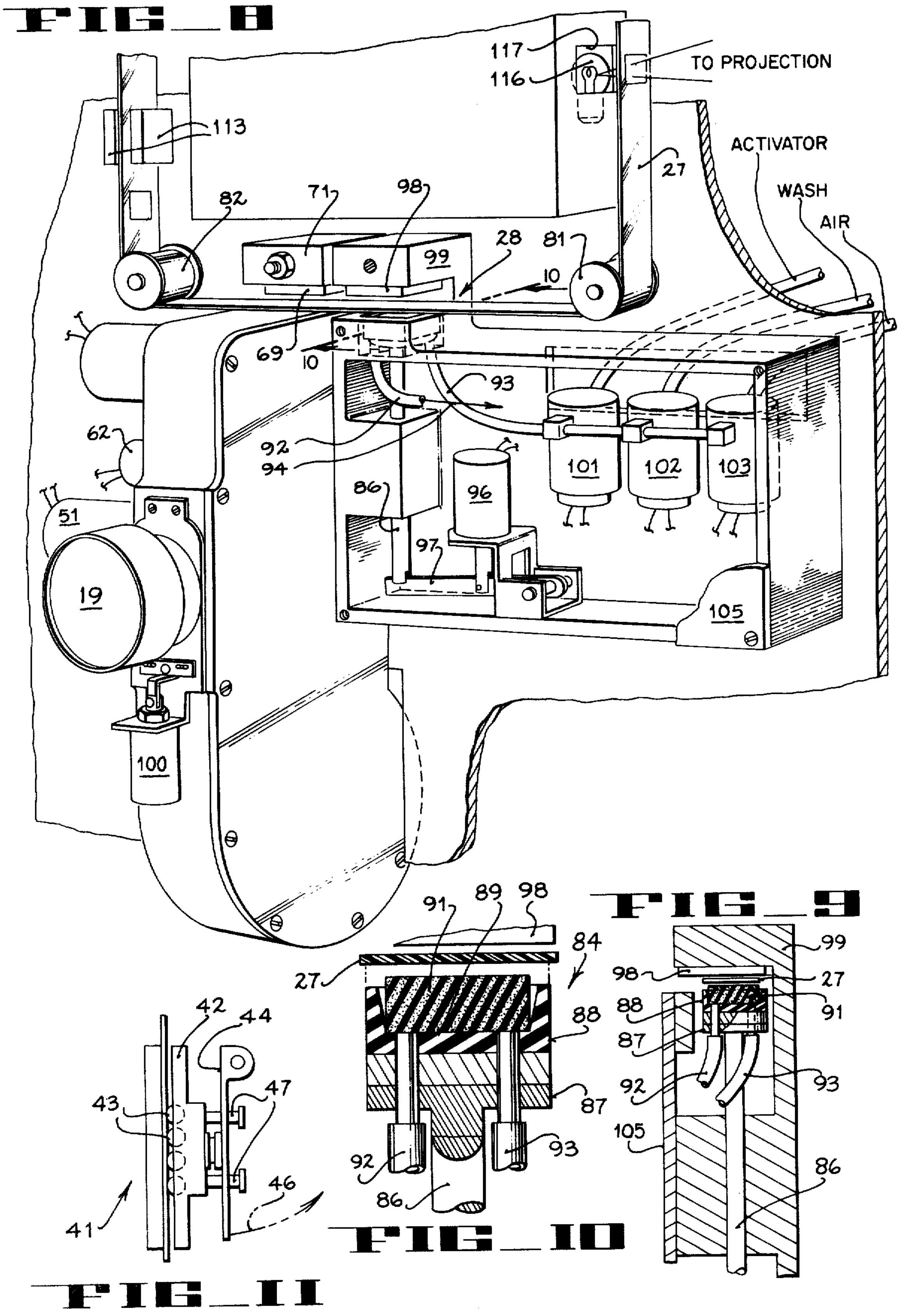
FIG. 8 shows an enlarged perspective view of a film processing system and apparatus for the system shown in FIG. 1 according to the invention.
FIG. 9 shows a side elevation section view of that portion of FIG. 8 including the processor station thereof as viewed from the right hand side of FIG. 8.
FIG. 10 shows an enlarged section detail of the processor head assembly shown in FIGS. 8 and 9.
FIG. 11 shows an enlarged detail side elevation view of a film gate as shown in FIG. 2.

*Trademark of E.I. Du Pont deNemours & Co. for a highly durable, transparent film of polyethylene terethphalate resin A receiving film of the above type, as is known, can be conditioned to receive an image of the image recorded on the microfilm by application of an "activator" to the surface of the receiving film 27. This is applied to the under surface of receiving film 27 (as shown in FIG. 3) by the processing or activator station 28 (FIG. 8) disclosed more fully herebelow.

The activator fluid is of known photographic chemistry type, such as potassium carbonate or sodium hydroxide used either in combination or separately. Such activator, of course, is suitably modified using known techniques in its activity so as to provide the desired film development contrast.

Figure 3:
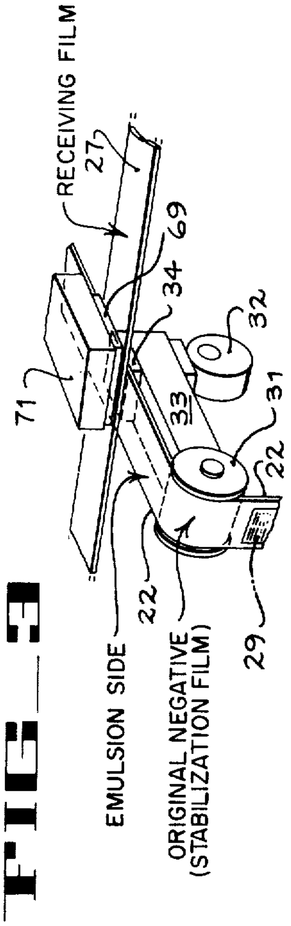
FIG. 3 shows a diagrammatic perspective detailed view for purposes of explanation.

In general, and still referring to FIG. 3, the stabilization film 22 carrying latent miniaturized images 29 recorded thereon is fed around a guide means such as guide roller 31 so that the emulsion side of film 22 carrying the latent image 29 passes in spaced confronting relation with that side of receiving film 27 carrying the normally inactive material thereon.

The emulsion side of film 22 can be brought into contact with the material carried on the under side of film 27 as shown in FIG. 3 by means of an eccentric 32 which, when rotated, lifts the end of clamp arm 33 to move one of two pressure pads 34, 36 whereby in the event that a particular frame of film 27, activated by application of a thin layer of activator substance, is located immediately in registration with a latent image carried by film 22, the clamping action of pads 34, 36 will serve to cause the latent image to provide a developed negative on film 22 while, at the same time, serve to develop or "reduce" the frame of film 27 registered therewith. In the present instance the reduced frame of film 27 becomes a positive of the negative image recorded on film 22.

Figures 2, 7, 12:
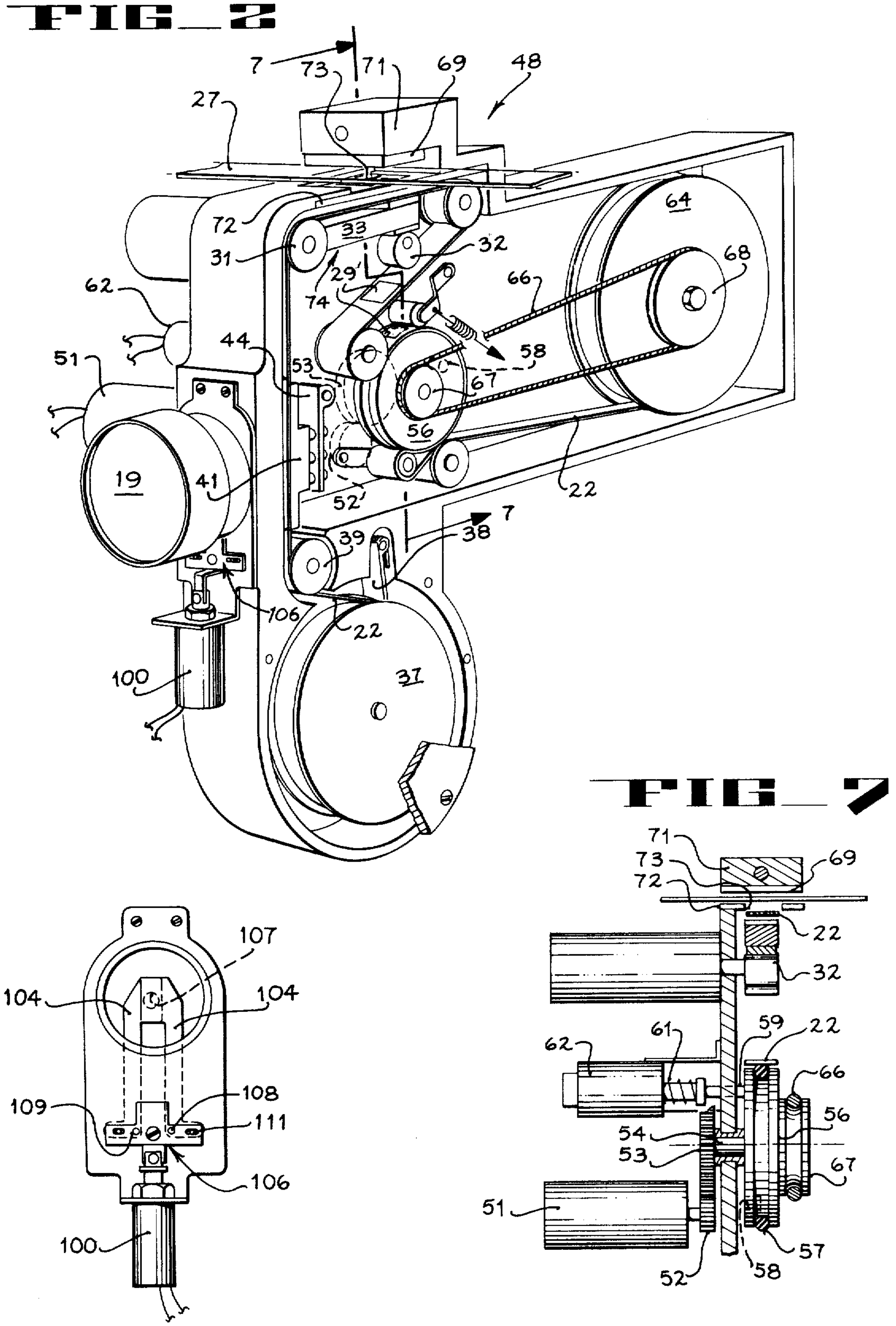
FIG. 2 shows an enlarged perspective view of a portion of the system shown in FIG. 1 with portions broken away for clarity according to the invention.
FIG. 7 shows an enlarged elevation section view taken along the line 7—7 of FIG. 2, showing a portion of the transfer station according to the invention.
FIG. 12 shows a front elevation view of a shutter mechanism for operating the lens of the camera in the microfilm recorder shown in FIG. 2.

Having in mind the foregoing general organization of the system, components thereof can be more readily understood as, for example, with reference to FIg. 2 the microfilm camera includes a supply roll 37, a drag brake 38 disposed to ride against flanges of roll 37. Stabilization film 22 leads from roll 37 around a guide roller 39 and upwardly through a film gate 41. As shown best in FIg. 11, film gate 41 includes a pressure plate 42 arranged with a number of cylindrical rollers or rotatable balls 43 carried by pressure plate 42. Further, a pivotable latch 44 is arranged to move in the direction of arrow 46 and in so doing carry with it pressure plate 42 by virtue of the retaining pins 47 each of which protrudes through latch 44 and is formed with a large head thereon.

Film 22 continues to move upwardly and around guide means such as roller 31, then passes under transversely moving receiving film 27 at an image transfer station 48 which can be referred to as a transfer gate station, for example. The foregoing designation of station 48 as indicating the transfer of an image is intended in the sense that information from film 22 is transferred to become substantially the same information on film 27. However, photographically speaking, what is recorded on film 27 is actually an image of an image and the latent image on film 22 is developed at the transfer station 48 while a positive of the same negative image is being made at the same station. All of this occurs, of course, at the same station 48.

As noted above with respect to FIG. 3, the latent image thereon is designated 29. However, after this latent image has been developed, it is designated 29' as shown in FIG. 2. Thus, the positive image 30 appears on film 27.

Means are provided for advancing film 22 by a sufficient number of frames so as to carry the exposed latent image 29 from film gate 41 to transfer station 48. Accordingly, means for driving the film 22 includes a drive motor 51 arranged to rotate a geared spindle 52. Spindle 52 engages a bull gear 53 for rotating shaft 54 of drive capstan 56. A rubber tire 57 rides in a groove formed around the periphery of capstan 56 for engaging film 22. The side face of capstan 56 includes a detent opeing 58 disposed on a radius to travel in a path including the end of a solenoid operated pawl 59 whereby as detent 58 passes under the end of pawl 59, the spring loading applied by spring 61 serves to drive pawl 59 into opening 58 and arrest rotation of capstan 56.

A solenoid 62 can, upon command, withdraw pawl 59 and permit motor 51 to again rotate capstan 56 for a complete revolution. One complete revolution of capstan 56 serves to carry the film 22 a distance equivalent to ten frames which corresponds to the displacement from the position immediately behind the optical lens 63 and film gate 41 to film transfer station 48. Accordingly, one revolution of capstan 56 will serve to advance the latent image on film 22 into registration with the receiving film 27 at film transfer station 48.

This forward movement of film 22, of course, also advances the film around the additional guide rollers shown in the drawing and ultimately supplies it to be wrapped aboue take-up roll 64. Take-up roll 64 is driven in substantially the same manner as the take-up reel of a motion picture projector is driven through a spring belt 66 wrapped about a pulley 68 driving the take-up roll and also trained about a pulley 67 carried by the axis of the drive capstan.

Transfer station 48 includes a resilient back-up pad 69, for example, on the order of 1/16th inch of rubber carried on the under side of a rigid overhanging support 71 and of a durometer hardness of approximately 55. A frameplate 72 includes an access opening 73 through which a relatively soft, resilient compression pad 34 (durometer approximately 35) can move in order to force film 22 upwardly therethrough and into engagement with film 27 so as to clamp the two films substantially together between pads 69 and 34.

Figure 4:
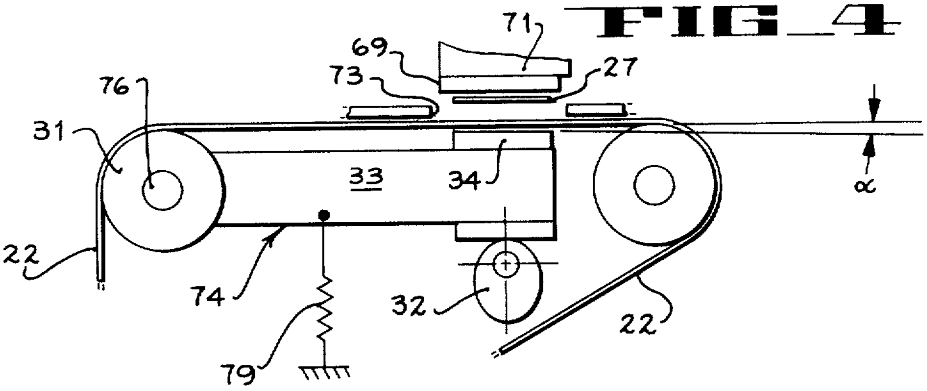
FIGS. 4, 5 and 6 show in side elevation a sequence of movements of a pressure pad located at an image-transfer station of the system shown in FIG. 1 according to the invention.
Figure 5:
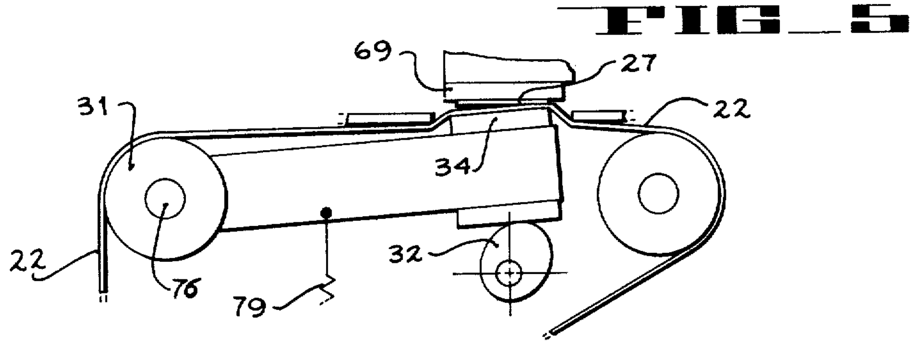
Figure 6:
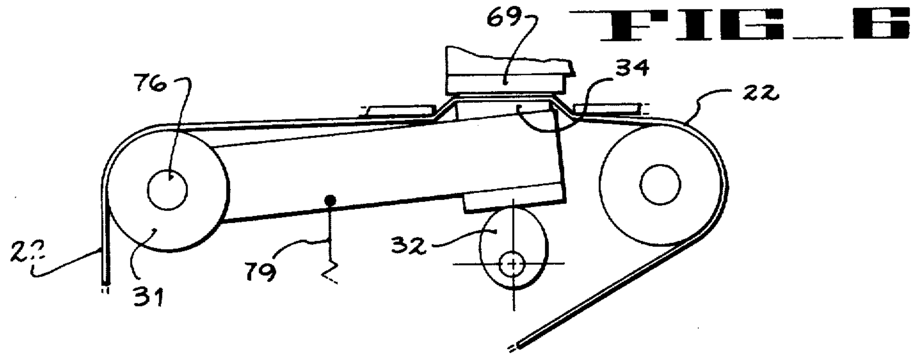

As shown best in FIGS. 4, 5 and 6, arm assembly 74 is pivoted about axis 76. Eccentric 32 drives arm assembly 74 against the pull of spring 79 to move arm assembly 74 between advanced and retracted positions relative to pad 69 for engaging and pressing the spaced films 22, 27 together betweeen pads 69 and 34 to develop an image on each.

The plane of pad 34 is normally disposed at a slight angle, for example, on the order of 10°, to the plane of the other pad 69. Accordingly, as film 22 is disposed at the transfer station, the high edge of pad 34 makes initial contact. Further, compression between film 22 and film 27 is accomplished on the basis of something of a squeegee action by applying pressure progressively across the two confronting films, as shown in the sequence of figures in the drawings. This action serves advantageously to remove all air bubbles from between the two films to provide a uniform development and distribution of activator material as then carried on film 27. The foregoing action serves to provide uniform and improved development of the images on both films.

Means have also been provided for processing film 27 as it moves, for example, from supply roll 25 to take-up roll 26. Accordingly, the activator station 28 includes a number of functions in addition to merely activating the material carried on the face of film 27. Guide rollers 81, 82 serve to direct the receiving film 27 in a path directly across the top of a processing head 84 carried on an upwardly extending actuator shaft 86 formed on its upper end with a circular steel button 87.

Head 84 includes a resilient cup 88 formed with a rectangular well 89 including sloping side walls and a rectangular pad or block 91 of porous sponge-like material disposed therein. The edges of cup 88 when urged against the films serve to form a seal to allow a vacuum flow of chemical, water or air into well 89.

Block 91 is disposed within well 89 for purposes of variegating the flow of liquids to insure a uniform, streakfree coating applied to the area of a photographic frame defined on film 27.

A pair of conduits 92, 93 extend upwardly through button 87 and into the cup-shaped well 89 for purposes of providing a vacuum-drawn flow of fluid into and out of well 89.

Accordingly, conduit 92 is coupled to a vacuum pump (not shown) represented by the arrow 94 which runs substantially continuously to apply suction through conduit 92.

Whenever the actuator solenoid 96 is energized, link 97 will lift shaft 86 upwardly so as to compress cup 88 and block 91 and the films firmly against a fixed pad 98 of resilient material such as 1/16th inch layer of rubber 98 carried under the overhanging rigid support 99 to form a seal between cups 88 and film 27. In so doing the suction applied along conduit 92 becomes applied via block 91 to conduit 93.

Using the foregoing means, it becomes a relatively easy matter to control any one of the three valves 101, 102 and 103 each of which is located in series with the others along conduit 93 (with the activator valve 101 disposed farthest downstream on conduit 93) and which respectively are coupled to a source of activator substance, a washing material, or air.

Thus, with processing head 84 in its raised position, vacuum from the vacuum pump can be applied selectively to any one of the three foregoing sources to draw fluid, such as activator material into the well 89 and fill block 91 to uniformly distribute activator and imbibe the material carried on the surface of film 27 thereby preparing it for receiving an image from film 22.

FIG. 12 shows a solenoid-operated shutter with solenoid 100 wherein a pair of superimposed blades 104 pivot quickly clockwise and counterclockwise respectively with the downward movement of a harness 106 so as to expose the lens opening 107. Blades 104 are caused to move clockwise and counterclockwise upon downward movement of harness 106 by virtue of the fact that each of blades 104 is pivoted at a respective one of the two pivot points 108, 109. Connecting pins 111 ride along slots associated therewith formed in the harness 106.

Finally, as schematically indicated in FIG. 1, means for selectively controlling the positioning of a given frame along film 27 is represented schematically by the counter 112, control logic 115 coupled to drive the capstan drive motor 30 as desired, and a sensor unit of suitable design 113 adapted in known style to read coded bits disposed along a margin of film 27 for activating counter 112 in known style.

Thus, a portion of tape 27 can be reserved for each of a number of files or dockets and then as documents are to be recorded into these docket areas, the high speed and efficiency of the tape transport carrying film 27 can quickly dispose the next available open frame in the appropriate region of film 27. At that time, the document can be entered into the file. Thus, when it is desired later to search the file to review all of the documents associated with a particular docket, film 27 can rapidly be addressed and positioned again by suitable means as schematically represented by counter 112 and sensing element 113 so as to dispose the first frame of that particular docket at a read-out station 114 indicated schematically in FIG. 1 simply by the incandescent light 116, aperture 117, light path 118 which is reflected via mirrors 119 and lens 121 onto a frosted glass screen 122 wherby the positive image 123 of the document can be examined.

The system as described above can use extremely thin film on the stored rolls 25, 26 since it is not required that film 27 functions as the photo-image forming roll. Silver halide must be kept in thick gel on a thick film typically in other types of equipment so as to keep from bending and curling, whereas once the silver is reduced it can be carried on a very thin film. Accordingly, the use of such extremely thin film permits the rolls of stored information 25, 26 to remain a reasonable size while containing a substantially greater number of pictures. Further, the ability to employ such a thin film as simply the emulsion itself without a backing, for example, can permit great acceleration and deceleration without slippage since the mass has been substantially reduced. It has been observed that with a 6 micron film, an acceleration of 10,000 inches per second can be achieved without measurable slippage.

Accordingly, the use of such a transport provides measurably lower access times to read out a particular microfilmed positive document carried on film 27 or to introduce an additional document into a particular file or docket.

Further, it is to be observed that both films are developed essentially at the same transfer station and, accordingly, the expense of developing both films is minimized. Finally, it should be observed that the microfilm file of documents contained in the stored rolls 25, 26 can be readily used in conventional microfilm readers and reader-printers.

Briefly, in operation, a document is photographed onto film 22. Using suitable controls of known type, the film 22 is advanced to the image transfer station 48. A selected frame of film 27 is then moved to the processing station 28. Next, solenoid 96 serves to lift the processing cup 88 and porous block 91 into engagement with film 27 beneath pad 98 so as to block off the flow of air into conduit 92 from any other source other than via conduit 93.

Valve 101 is then activated so as to permit the suction in well 89 to draw activator into well 89 to fill block 91. This action serves to imbibe the receiving film with the activator. At that point, it is usually desirable to close valve 101 and open valve 103 to apply a short suction from pump 94 to remove the activator in well 89 and block 91 to dry out the compressed block 91. As the sponge-like pad or block 91 is then withdrawn away from film 27, it further sponges away any excess drop of activator carried on the designated frame portion of film 27.

Next, cup 88 is retracted and film 27 advanced to the transfer station. Subsequently, the clamping action described above is applied by rotating eccentric 32 as above described thereby applying a squeegee action between padsd 34, 69 to eliminate air bubbles. Then, the clamping action is relieved by continued rotation of the eccentric and film 27 is reversed to be disposed at processing station 28 for subsequent processing. Head 84 is lifted and valve 102 selected to introduce a wash of material. Valve 103 is opened to provide vacuum drying of the surface of the frame which has received the image.

I claim:

1. A method of activating a receiving film comprising the steps of compressing a sponge-like, absorbent, resilient pad against the receiving film, filling said pad with activator fluid to imbibe a segment of said receiving film while maintaining said pad compressed against said receiving film, drawing off the activator and drying out said pad via a vacuum applied to said pad while said pad remains compressed, and retracting the activator-free pad from said receiving film to sponge off any remaining excess drop of activator carried by said receiving film.

2. A method according to claim 1 comprising the further steps of disposing said pad and a container in a fluid flow path, continuously applying a suction to one end of said path, and coupling fluid sources to the other end of said path whereby compressing said container against said receiving film serves to draw fluid from a selected one of said sources via said path.

3. A method of activating a receiving film comprising the steps of supporting a porous, sponge-like, resilient pad to protrude from one side of an open container, compressing said container and pad against a segment of the receiving film to form a seal between said container and said receiving film, filling said pad with activator fluid to imbibe said segment of said film, applying a suction flow to said pad while said container and pad remain compressed against said receiving film to draw activator out of said pad for drying said pad, and retracting the dried pad from said receiving film to decompress the pad so as to sponge off any remaining excess drop of activator carried by said receiving film.

4. In a document storage system of a type for recording an image on the emulsion side of a first film for transfer to a second film, a film processing station including means for disposing the first and second films at a position in spaced confronting relation with the emulsion side of said first film confronting said second film, a pair of pads flanking said films at said position, one of said pads being movable between advanced and retracted positions relative to the other for engaging and pressing said spaced films together to develop an image on each film, the improvement comprising means supporting the plane of one of said pads at a slight angle to the angle of the other pad, said films passing between the pads, and means for urging the first named one of said pads relative to the other in a predetermined direction to initially engage said films between an edge margin portion of the second named one of said pads and the other pad and in response to continuing said urging to progressively compress more and more of the contact area of the second named said one pad against a progressively increasing area of said other pad, thereby applying a squeege action in compressing the films together between the pads for removing fluid captured between the films.

5. In a document storage system of a type for recording an image on the emulsion side of a first film for transfer to a second film, an image-transfer station including means for disposing the first and second films at a position in spaced confronting relation with the emulsion side of said first film confronting said second film, a pair of resilient pads flanking said films at said position, one of said pads being movable between advanced and retracted positions relative to the other for engaging and pressing said spaced films together to develop an image on each film, the improvement comprising means supporting the plane of one of said pads at a slight angle to the plane of the other pad, said films passing between said pads, and means for urging the first named one of said pads relative to the other to initially engage said films between an edge margin portion of said pads and in response to continued urging serving to apply a progressively increasing surface area of the pads to said second film, thereby applying a squeegee action in compressing the films together for removing fluid captured therebetween.

6. In a document storage system of a type having means for disposing first and second films in confronting image-transfer relation, said first film being prepared with a photoresponsive emulsion on one surface for optically recording a miniaturized image thereon of a document, said second film having a material carried on one surface thereof, said material being normally inactive but capable of being activated for receiving an image of the first named image transferred thereto, a film processing apparatus, said processing apparatus comprising an open cup-shaped container confronting said material of said second film and having a peripheral edge serving to define a frame on said second film to be activated, a porous, sponge-like, resilient pad disposed in said container for contact with said material, a vacuum flow path leading through said container for drawing fluid through said pad, means continuously drawing a vacuum via said flow path, said sponge-like pad protruding out of said container beyond a plane defined by said peripheral edge, means for moving said container into engagement with said second film to provide a seal at said peripheral edge, a fluid supply opening leading into said container from a plurality of fluid sources, said sources including activating fluid for said material, a washing fluid, and a gas, and valve means selectively operable to couple any of said sources to said supply opening to cause said vacuum to draw fluid from the selected source into said container under the influence of said vacuum when said periphery forms said seal.

* * * * *